(12) United States Patent
Dwyer et al.

(10) Patent No.: US 7,566,581 B2
(45) Date of Patent: Jul. 28, 2009

(54) SYSTEMS AND METHODS FOR CREATING MEMS GYROS

(75) Inventors: Paul W. Dwyer, Seattle, WA (US); Peter L. Cousseau, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 451 days.

(21) Appl. No.: 11/380,386

(22) Filed: Apr. 26, 2006

(65) Prior Publication Data

US 2007/0254396 A1 Nov. 1, 2007

(51) Int. Cl.
*H01L 21/00* (2006.01)
(52) U.S. Cl. .................. 438/48; 356/467; 257/E21.587
(58) Field of Classification Search .................. 438/48, 438/50, 52; 716/4, 5, 8, 11, 12; 356/467; 257/E21.587
See application file for complete search history.

(56) References Cited

U.S. PATENT DOCUMENTS 6,956,268 B2 * 10/2005 Faris .......................... 257/415
6,974,653 B2 * 12/2005 Leung et al. .................. 430/30

\* cited by examiner

*Primary Examiner*—David S Blum

(57) ABSTRACT

Methods and systems for creating microelectromechanical system (MEMS) gyros. The methods and systems include generating a map of motor bias and creating MEMS gyros based on the map of motor bias to achieve a higher yield of usable MEMS gyros per wafer. The systems include a processor with components configured to determine paths of optimal motor bias for a given deep reactive ion etcher on a wafer, a stepper for imprinting a pattern for each gyro in an orientation that corresponds to the path of optimal motor bias each gyro is calculated to be most near on the wafer, and a deep reactive ion etcher to etch the gyros in the wafer.

15 Claims, 10 Drawing Sheets

SYSTEMS AND METHODS FOR CREATING MEMS GYROS

BACKGROUND OF THE INVENTION

Current methods for producing Micro Electro Mechanical System (MEMS) gyros using Deep Reactive Ion Etching (DRIE) technology result in subtle differences in the angle of some structural components of MEMS gyros. For example, if the angle of a flexure is not completely perpendicular to the plane of a MEMS gyro device, it will deviate out of place creating an error source when it is driven to oscillation. These differences are distributed across each wafer in a reproducible pattern for particular DRIE devices. The subtle differences are referred to in this application as motor bias. If this motor bias exceeds specified limits, it results in a loss of yield of the number of usable MEMS gyros per wafer.

Thus, there is a need for reducing the effect of motor bias in the creation of MEMS gyros and creating a higher yield per wafer.

BRIEF SUMMARY OF THE INVENTION

The present invention comprises methods and systems for creating microelectromechanical system (MEMS) gyros by generating a map of motor bias and creating MEMS gyros based on the map of motor bias to achieve a higher yield of usable MEMS gyros per wafer. The systems include a processor with components configured to determine paths of optimal motor bias for a given deep reactive ion etcher on a wafer, a stepper for imprinting a pattern for each gyro in an orientation that corresponds to the path of optimal motor bias each gyro is calculated to be most near on the wafer, and a deep reactive ion etcher to etch the gyros in the wafer.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
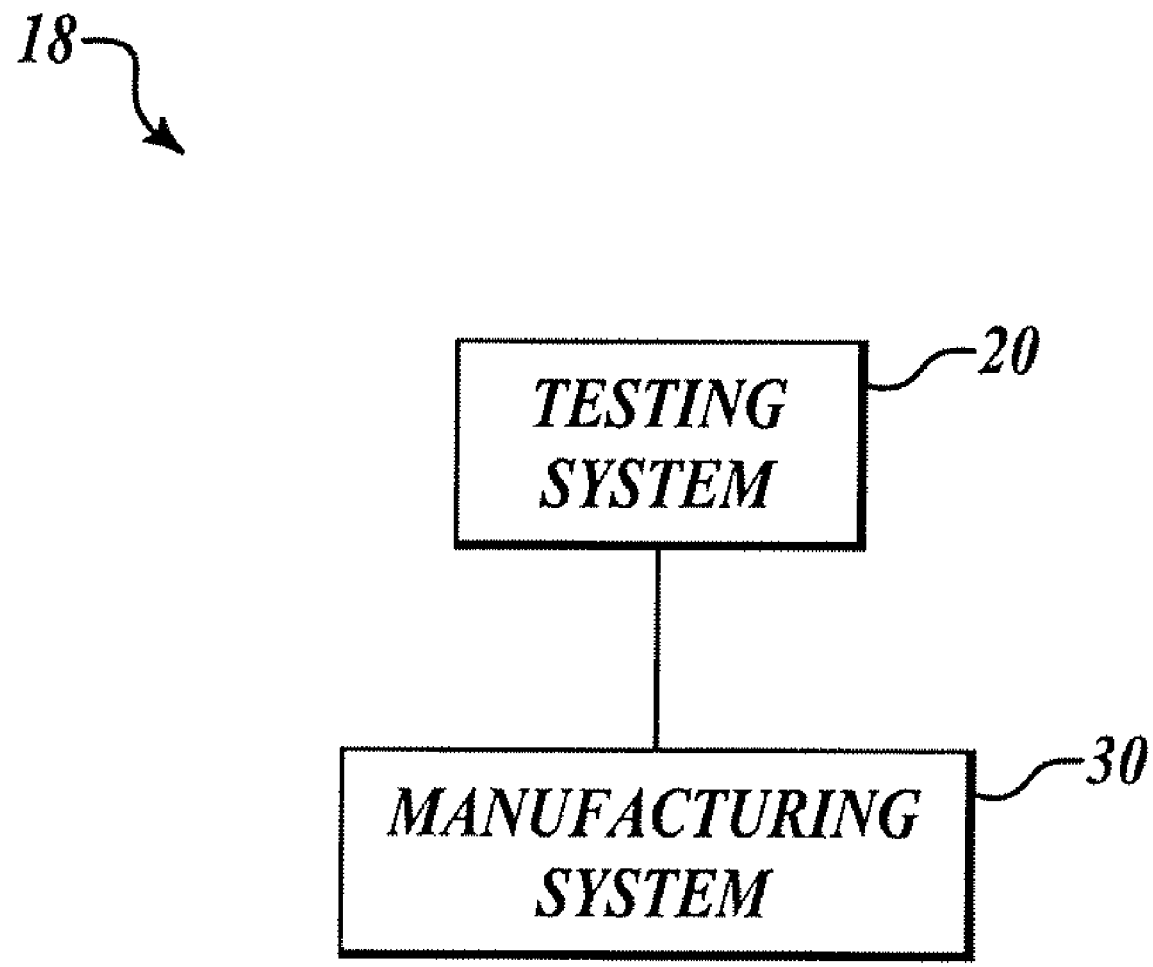
FIG. 1 illustrates a schematic view of a system in accordance with an embodiment of the present invention.

FIG. 1 illustrates a schematic view of an example system 18. In one embodiment, the system 18 includes a testing system 20 and a manufacturing system 30. The testing system 20 is configured to produce a map of motor bias for a given deep reactive ion etching (DRIE) device. The manufacturing system 30 uses the map of motor bias to produce an optimal path of motor bias for the DRIE device across a wafer. This optimal path is then rotated by one or more angles to produce additional optimal paths of motor bias that are related to the angle by which the initial optimal path of motor bias was rotated. The manufacturing system 30 is also configured to determine the best orientation for each gyro to be created on a wafer by determining the closest optimal path of motor bias in relation to each gyro on the wafer. The manufacturing system 30 is further configured to create MEMS gyros based on the determined orientation. The system 30 may include a gyro generating device that in some embodiments includes a DRIE device.

Figure 2:
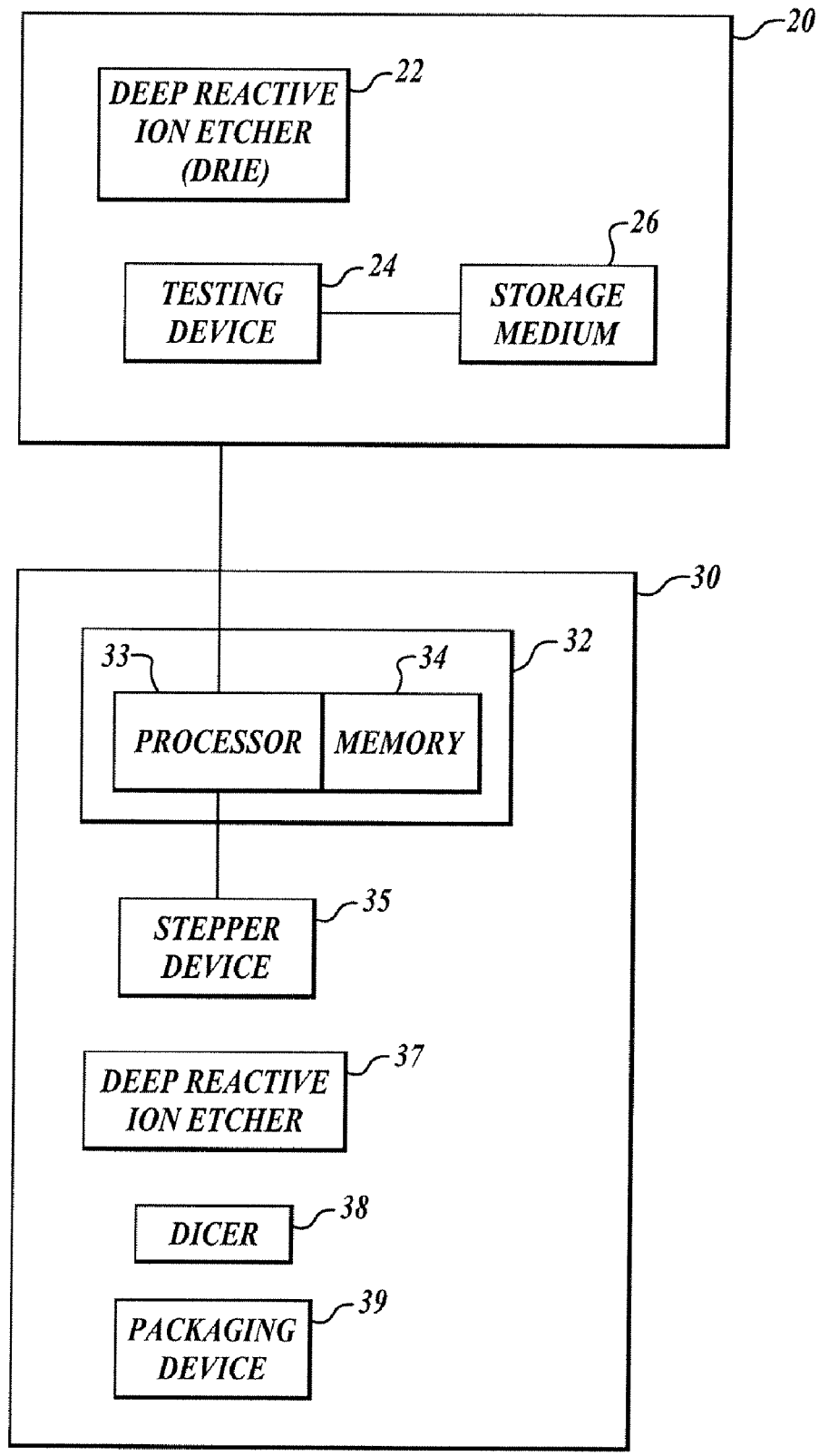
FIG. 2 illustrates a schematic view showing additional components of the system shown in FIG. 1 in accordance with an embodiment of the present invention.

FIG. 2 illustrates a more detailed schematic view of the testing system 20 and the manufacturing system 30 in accordance with another embodiment of the present invention. The testing system 20 includes a Deep Reactive Ion Etch (DRIE) device 22, a testing device 24, and a storage medium 26. In some embodiments, the testing device 24 includes a probe stand and a probe mounted on the probe stand, both not shown. The manufacturing system 30 includes a computer 32 having a processor 33 and a memory 34 in data communication with a stepper device 35. The manufacturing system 30 also includes a DRIE device 37, a dicer 38, and a packaging device 39.

In this embodiment, a wafer (not shown) having MEMS gyro devices in a single orientation prepared for the etching step, is placed in the DRIE device 22 for etching. After the MEMS gyros have been etched into the wafer, the testing device 24 is used to probe the gyros on the wafer. The testing results are recorded as a map of motor bias, and in some embodiments it may be stored on the storage medium 26 which is in data communication with the processor 33 at least a portion of the time. In this embodiment, the testing device 24 is in data communication with the processor 33 and as such, the computer 32 is able to store the testing results directly without use of the storage medium 26. The testing results may reside in the memory 34 or the computer 32 may store these results on a hard drive or other secondary storage medium (not shown). The computer 32 contains a program residing in the memory 34 which instructs the processor 33 to determine a path of optimal motor bias based on the map of motor bias produced by the testing device 24. The path of optimal motor bias is then rotated through one or more angles with respect to a coordinate system in the plane of the wafer and having its origin in the center of the wafer by a program residing in memory 34 which instructs the processor 33 to carry out the rotations and store the results. These one or more angles are determined based on the capabilities of a stepper to be used in imprinting patterns for the MEMS gyros on a wafer.

After all desired paths of optimal motor bias have been created, the computer 32 determines the best orientation for each MEMS gyro to be created on a new wafer (not shown). The processor 33 determines which path of optimal motor bias is closest to each MEMS gyro to be produced on the wafer. These results are stored in the memory 34 or alternative storage. The computer 32 is then used to instruct the stepper device 35 to expose a wafer with each gyro in its proper orientation. In some embodiments, the stepper device 35 may expose blocks of gyros in a given direction rather than exposing each gyro individually. After the stepper device 35 has exposed the entire wafer of MEMS devices, by a photo lithography process for example, the wafer is placed in the DRIE device 37 for etching.

After the wafer has been etched, the dicer 38 is used to separate the gyros from the wafer in this embodiment. In other embodiments, the gyros may be released from the wafer using other processes such as ultrasonic machining or etching through the entire wafer. After the gyros have been released from the wafer, the packaging device 39 packages the gyros in preparation for sale or use.

Figure 3:
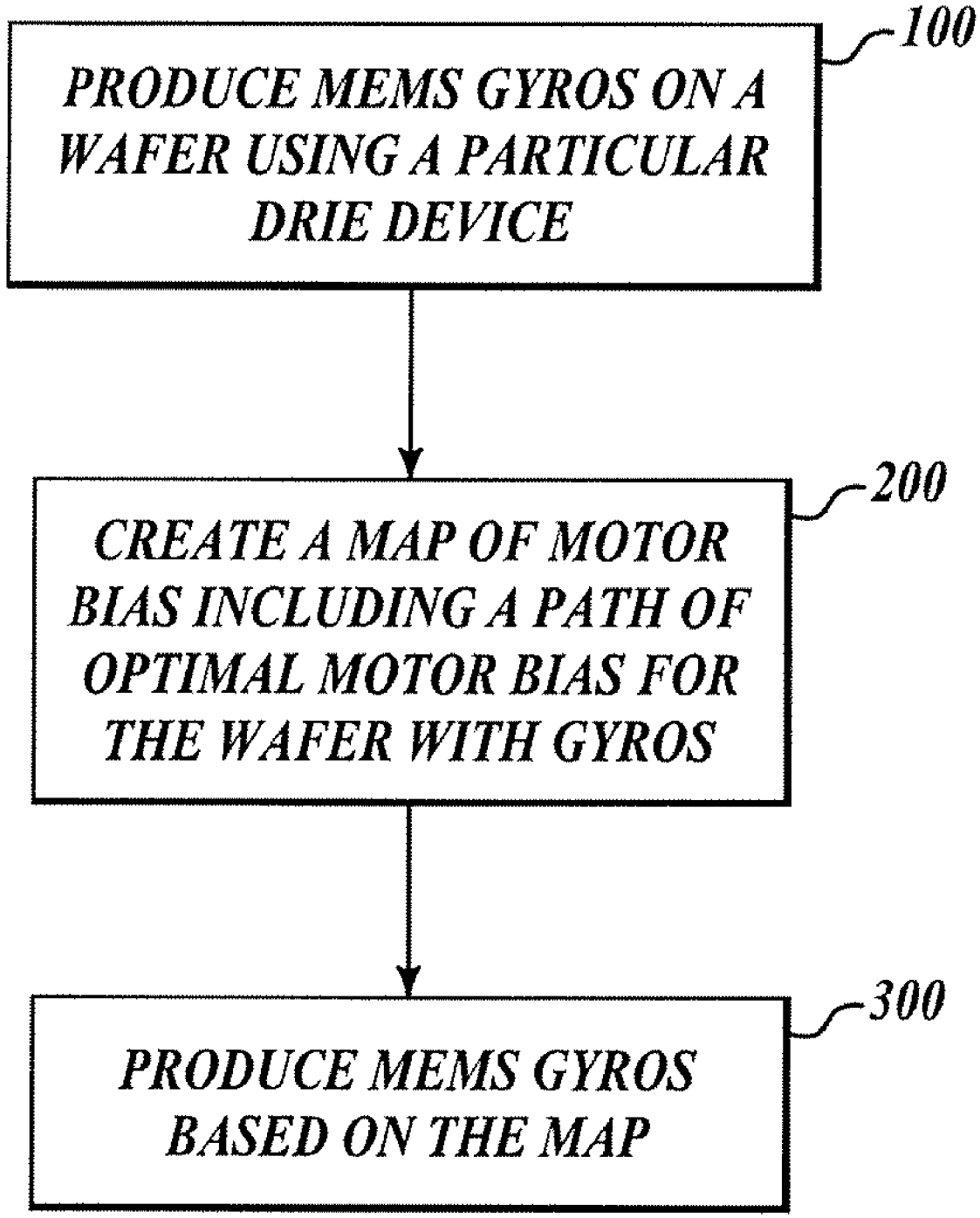
FIGS. 3-5 are flowcharts of a method of creating MEMS gyros in accordance with another embodiment of the present invention.

FIG. 3 is a flowchart of a method for producing MEMS gyros. The method of this embodiment includes producing MEMS gyros on one or more wafers using a particular DRIE device at a block 100. Next, at a block 200, a map of motor bias is created for the one or more wafers, including a path of optimal motor bias. At a block 300, MEMS gyros are produced based on the map created.

Figure 4:
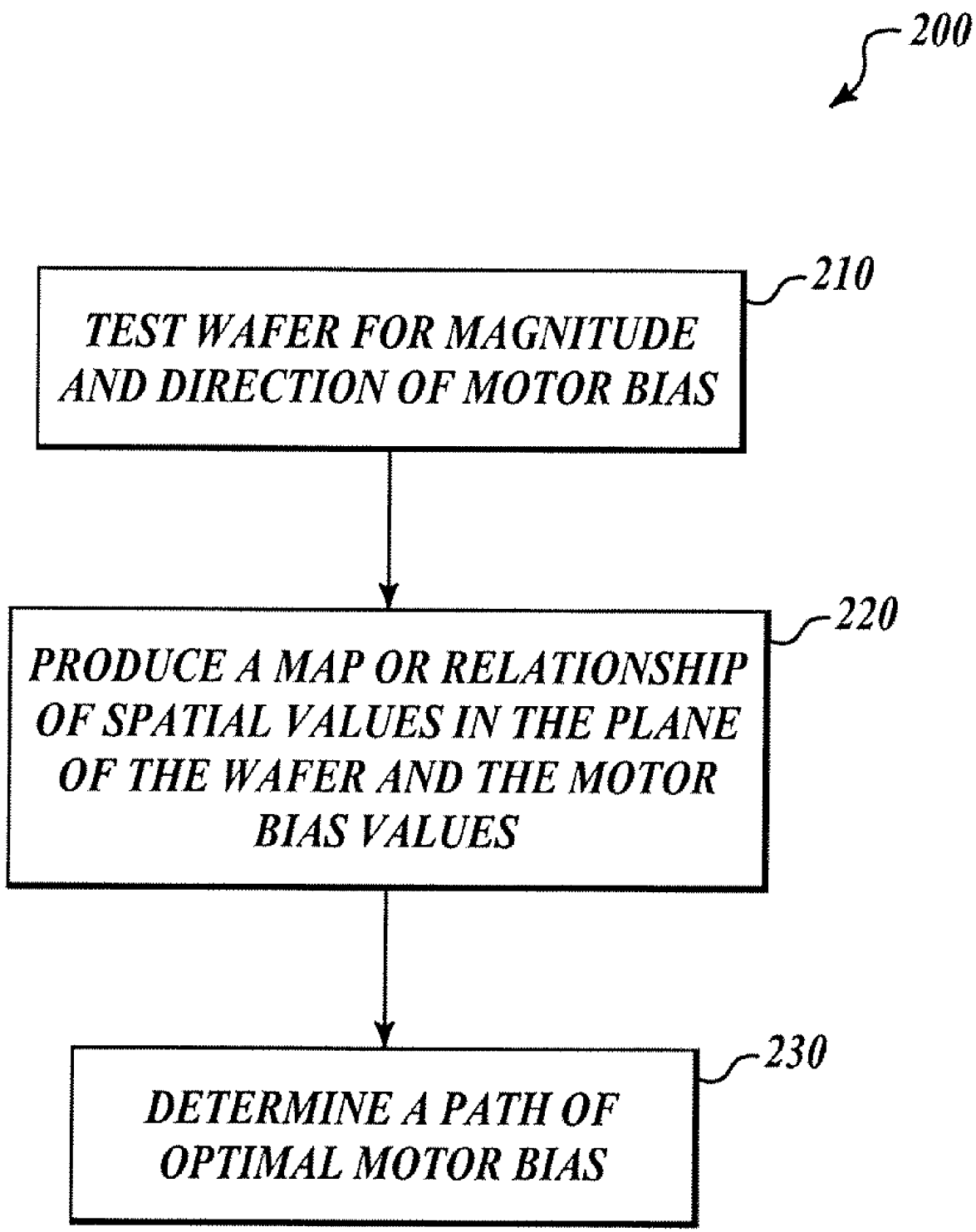

FIG. 4 shows additional detail for the block 200 of FIG. 3 in accordance with one embodiment of the invention. The step of creating a map of motor bias including a path of optimal bias is shown to include three more detailed blocks in FIG. 4. First, at a block 210, a wafer is tested for values of the magnitude and direction of motor bias. This may be performed by placing the wafer in a position where it can be electrically probed to activate each MEMS gyro while the bias values are measured and stored. Next, at a block 220, a map or relationship of spatial values in the plane of the wafer along with the motor bias values is produced. Then, at a block 230, a path of optimal motor bias in the produced map is determined.

Figure 5:
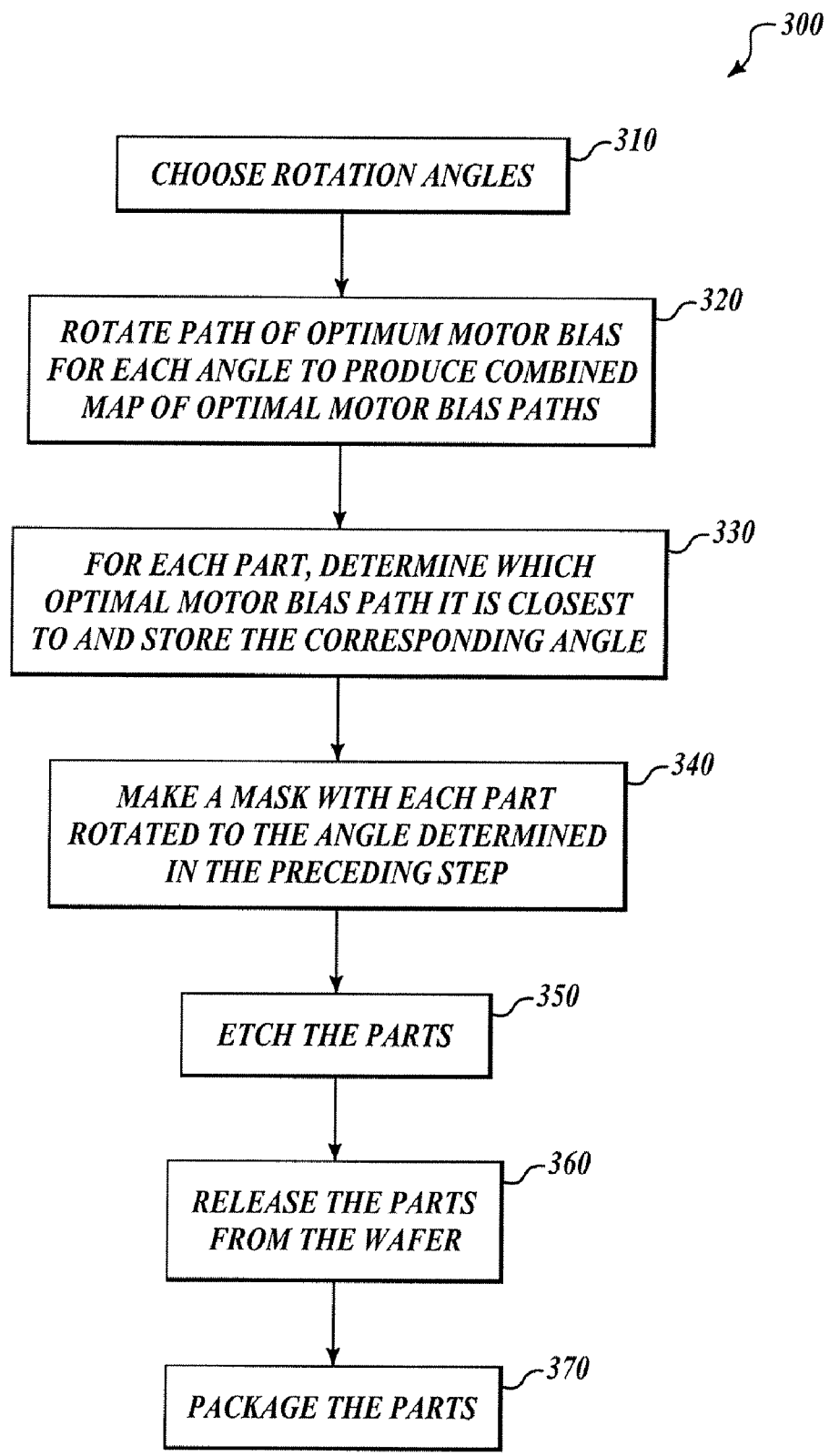

FIG. 5 shows additional detail for the block 300 of FIG. 3 in accordance with one embodiment of the present invention. First, at a block 310, rotation angles are chosen. Next, at a block 320, the path of optimal motor bias is rotated for each angle to produce a combined map of optimal motor bias paths. Then, at a block 330, it is determined which optimal motor bias path is closest to each MEMS gyro to be produced on the wafer and the resulting values are stored along with their corresponding angles. This is followed by a block 340, where a wafer with each MEMS gyro part rotated to the correct angle determined in the preceding block is exposed by a stepper. Then, at a block 350, the parts are etched in the wafer and at a block 360 are released from the wafer. This is followed by a block 370 where the parts are packaged.

Figure 6:
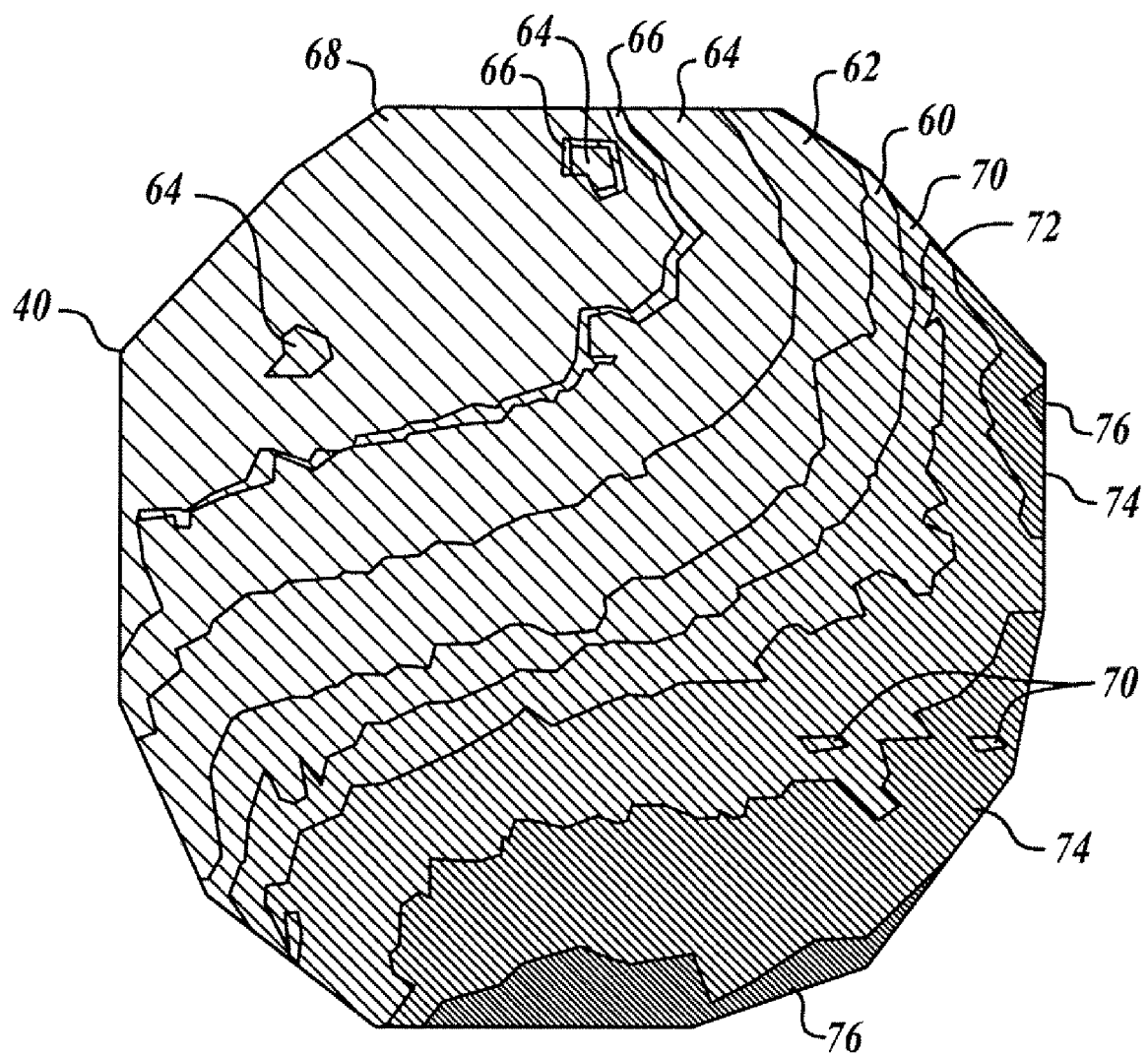
FIG. 6 shows an example of a map of motor bias for one wafer.

FIG. 6 illustrates an example of a motor bias map 40 of a wafer produced in accordance with one embodiment of the present invention. A wafer that has been subjected to the etching process and undergone testing is illustrated along with a variety of regions showing different motor bias values. In the example shown, a region 60 illustrates the region with motor bias values closest to zero. Regions 62, 64, 66, and 68 show regions with increasing positive values of motor bias in this example. As can be seen in the figure, the regions are not necessarily contiguous. The region 64 which indicates a region of MEMS gyros having motor bias values greater than those in the region 62 but less than those in the region 66 is shown to exist mostly in a contiguous band, but also includes two areas not within or adjacent to this band and which are surrounded by other regions. Regions 70, 72, 74, and 76 show regions with increasingly negative values of motor bias in this example.

Figure 7:
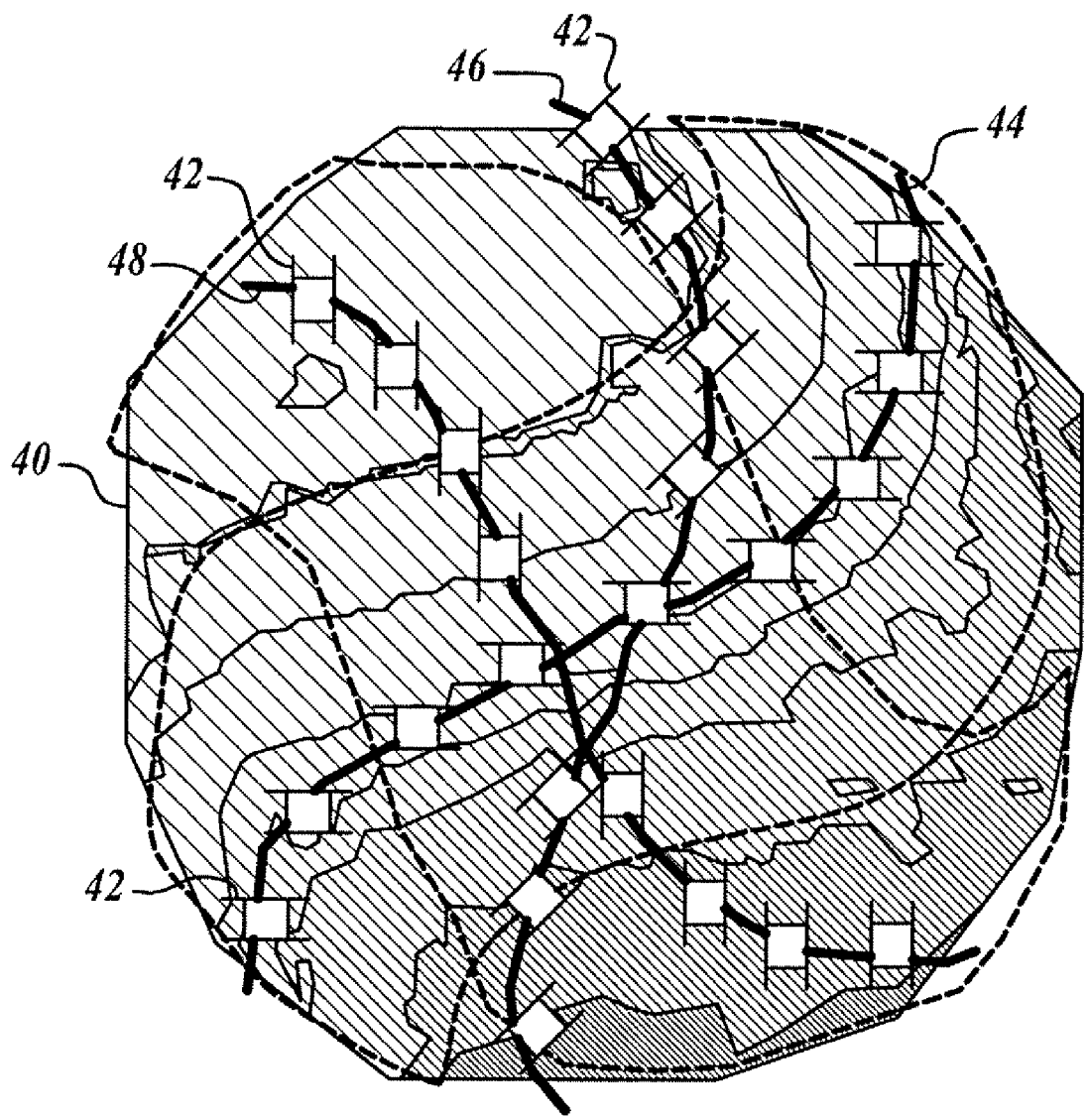
FIG. 7 is an example of a motor bias map showing paths of optimal motor bias in accordance with one embodiment of the present invention.

FIG. 7 illustrates an example of a motor bias map including three determined optimal motor bias paths 44, 46, and 48. Two of the optimal motor bias paths 46 and 48 have been rotated 45° and 90°, respectively, from an initial value corresponding to the angle of the optimal motor bias path 44. The icons 42 show MEMS gyro orientation consistent with the corresponding optimal motor bias paths 44, 46, and 48.

Figure 8:
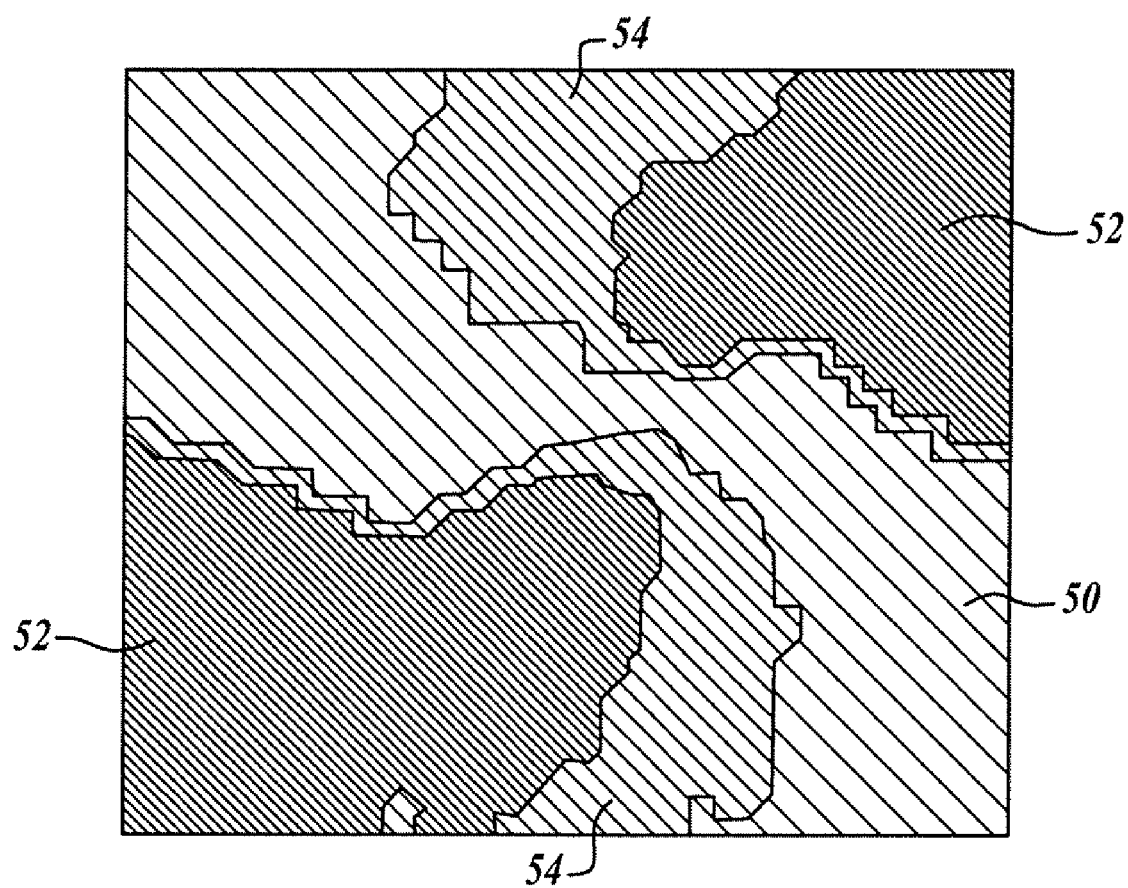
FIG. 8 is an example showing the rotational distribution of gyros based on the optimal paths shown in FIG. 7.

FIG. 8 illustrates an example distribution of MEMS gyro orientations based on their proximity to a given optimal motor bias path. These values correspond to those determined in the block 330 of FIG. 5. Area 50 indicates a region of a first angle for MEMS gyros. For example, the first angle could be defined as 0° in one embodiment relative to a coordinate system established in the plane of a wafer with its origin at the center of each MEMS gyro when the gyros are oriented in a direction corresponding to the orientation that minimizes motor bias along a non-rotated determined optimal motor bias path. Areas 52 show another region where the MEMS gyros will be rotated at a second angle. For example, this could be at 45° in one embodiment, indicating a counterclockwise rotation of each MEMS gyro about an axis located at the center of each gyro. Similarly, areas 54 illustrate a third region of rotation for the MEMS gyros. In one embodiment, this could be 90°, indicating a counterclockwise rotation of each MEMS gyro from the originally defined 0° orientation about an axis located at the center of each gyro. Other embodiments could include different angles of rotation. For example, the second and third angles could be 120° and 240° rather than 45° and 90°. It is also possible that fewer or more angles of rotation could be used, resulting in more gyro orientations on the wafer. The angles are determined based on the capabilities of a stepper to be used in imprinting patterns for the MEMS gyros on a wafer. Additionally, it is possible that the original gyro orientation corresponding to a non-rotated optimal motor bias path might not even be used, instead using only rotations other than those corresponding to a 0° rotation.

Figure 9:
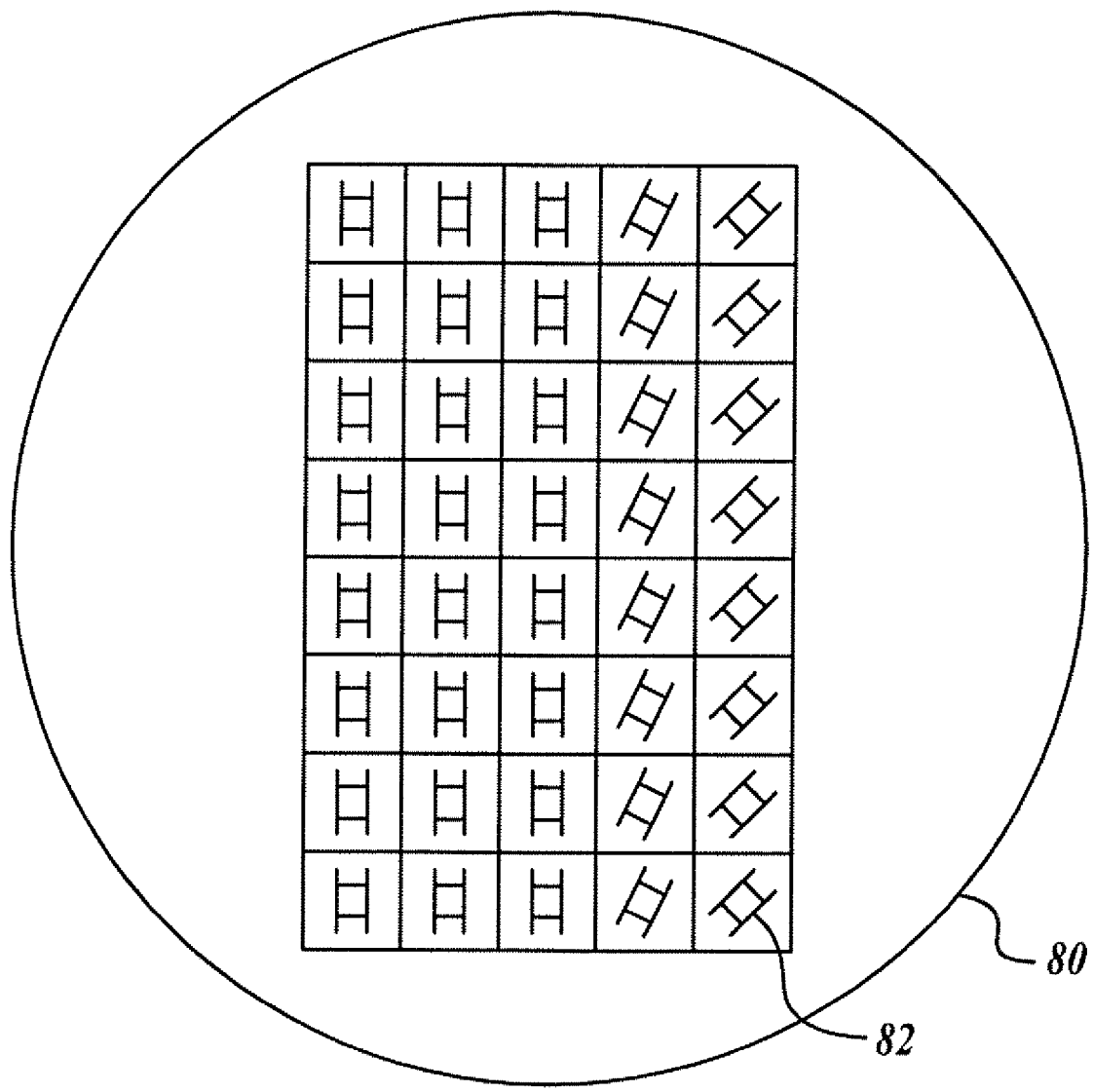
FIG. 9 shows an example of MEMS devices produced on a wafer for dicing release.

FIG. 9 illustrates an example of a wafer 80 that has been exposed to produce a plurality of gyros 82 in accordance with the process described above. In this example, the gyros 82 have been prepared for dicing. This is why the lines between the MEMS gyro are shown as being straight. By positioning the gyros 82 in this manner, the wafer 80 can be easily diced.

Figure 10:
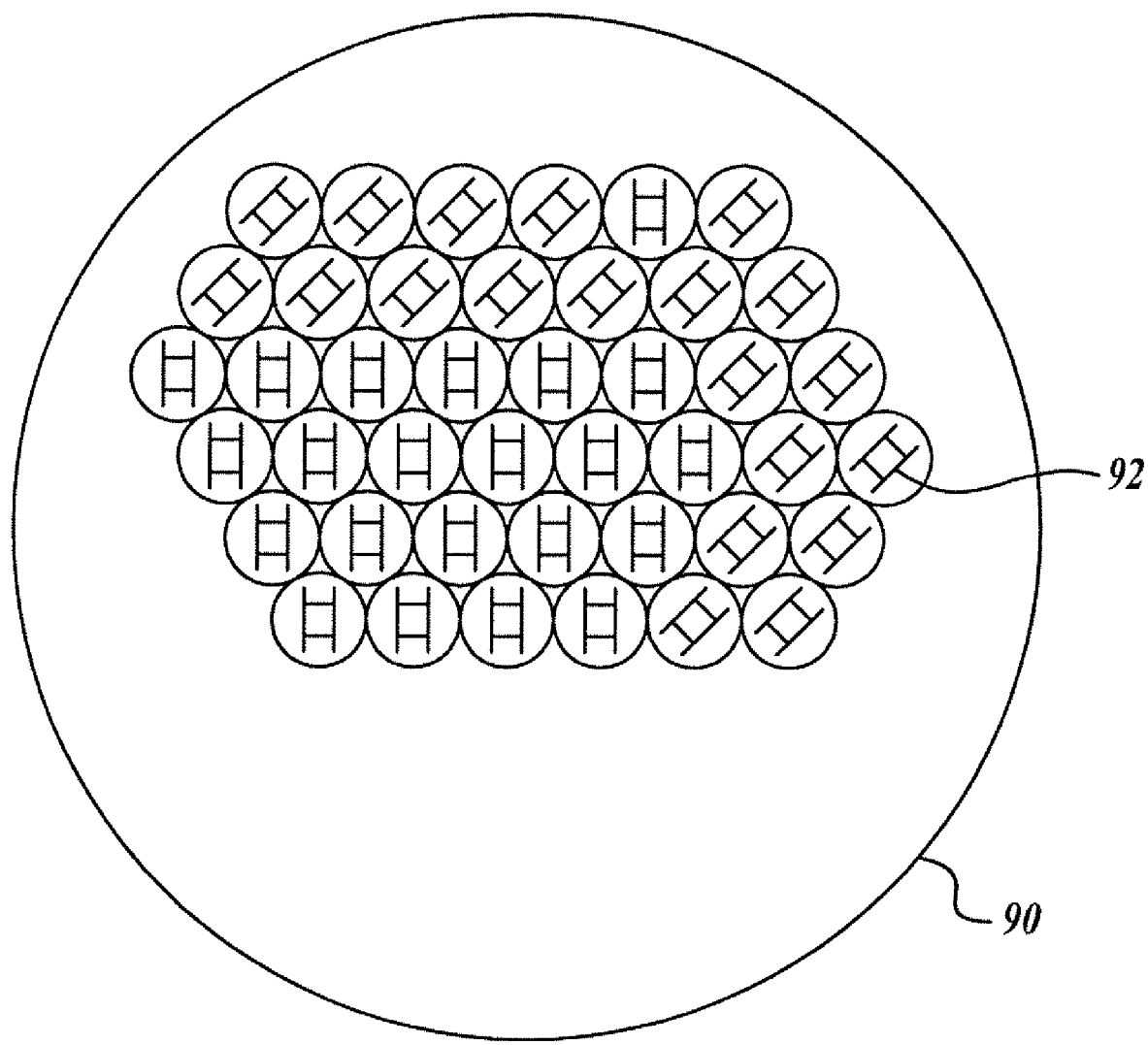
FIG. 10 shows an example of MEMS gyros produced on a wafer in preparation for release by etching.

FIG. 10 illustrates a wafer that has been exposed in accordance with an additional embodiment of the invention. In FIG. 10, wafer 90 has MEMS gyro devices 92, each of which are surrounded by a circle. These circles represent regions that would be either etched or ultrasonically machined in this example. Ultrasonic machining would be preferably used in the case where a pyrex substrate was employed. Etching all the way through the substrate could be used in an embodiment where the substrate is silicon.

While the preferred embodiment of the invention has been illustrated and described, as noted above, many changes can be made without departing from the spirit and scope of the invention. For example, computations may be performed in the same or in different computing devices. Also, the stepper may be controlled by a controller other than the computer used to calculate optimal paths and placements of the MEMS gyros to be produced. Accordingly, the scope of the invention is not limited by the disclosure of the preferred embodiment. Instead, the invention should be determined entirely by reference to the claims that follow.

What is claimed is:

1. A method for creating microelectromechanical system (MEMS) gyros comprising:

etching a plurality of gyros in a first direction on a test wafer;

determining motor bias values for the etched plurality of gyros;

storing the determined motor bias values;

generating a map of motor bias based on the stored motor bias values; and creating MEMS gyros based on the map of motor bias.

2. The method of claim 1, wherein creating MEMS gyros comprises:

determining a first path of optimal motor bias corresponding to the first direction based on the generated map of motor bias;
determining a second path of optimal motor bias;
calculating which of the determined paths of optimal motor bias is the closest path of optimal motor bias for each gyro to be produced; and
creating gyros on a wafer in an orientation that corresponds to the calculated closest path.

3. The method of claim 2, wherein determining the second path of optimal motor bias comprises rotating the first path of optimal motor bias by a first angle from the first direction.

4. The method of claim 3, wherein creating MEMS gyros further comprises:
determining a third path of optimal motor bias by rotating the first path of optimal motor bias by a second angle from the first direction.

5. The method of claim 4, wherein creating gyros on a wafer in an orientation that corresponds to the calculated closest path comprises:
imprinting a pattern for each gyro on a wafer in an orientation corresponding to the path of optimal motor bias the gyro was calculated to be most near on the wafer; and
etching the wafer using a deep reactive ion etcher corresponding to the generated map of motor bias.

6. The method of claim 4, wherein the first angle is approximately 45 degrees and the second angle is approximately 90 degrees.

7. The method of claim 4, wherein the first angle is approximately 120 degrees and the second angle is approximately 240 degrees.

8. The method of claim 4, wherein creating MEMS gyros further comprises determining one or more additional paths of optimal motor bias by rotating the first path of optimal motor bias by additional angles from the first direction.

9. A system for creating microelectromechanical system (MEMS) gyros comprising:
a testing system for generating a map of motor bias, the testing system comprising:
a deep reactive ion etcher for etching gyros in a first direction on one or more test wafers;
a testing device for determining motor bias values of the gyros on the one or more test wafers; and
a storage medium for storing the motor bias values; and
a manufacturing system for creating MEMS gyros based on the map of motor bias generated by the testing system.

10. The of claim 9, wherein the manufacturing system comprises:
a memory unit;
a processor in data communication with the memory unit, the processor comprising:
a first component configured to determine a first path of optimal motor bias based on the map of motor bias produced by the testing system;
a second component configured to determine a second path of optimal motor bias; and
a third component configured to calculate the closest path of optimal motor bias for each gyro to be produced; and
a gyro generating device for generating gyros on a second wafer in an orientation that corresponds to the calculated closest path.

11. The of claim 10, wherein the second component is configured to determine the second path of optimal motor bias by rotating the first path of optimal motor bias by a first angle from the first direction.

12. The of claim 11, wherein the processor further comprises a fourth component configured to determine a third path of optimal motor bias by rotating the first path of optimal motor bias by a second angle from the first direction.

13. The of claim 12, wherein the gyro generating device comprises:
a stepper for imprinting a pattern for each gyro on the second wafer in an orientation corresponding to the path of optimal motor bias the gyro was calculated to be most near on the second wafer; and
a deep reactive ion etcher corresponding to the generated map of motor bias.

14. The of claim 12, wherein the first angle is approximately 45 degrees and the second angle is approximately 90 degrees.

15. The system of claim 12, wherein the first angle is approximately 120 degrees and the second angle is approximately 240 degrees.

* * * * *